United States Patent
Osanai et al.

(10) Patent No.: US 8,382,095 B2
(45) Date of Patent: Feb. 26, 2013

(54) SHEET FEEDING UNIT, IMAGE READING DEVICE INCLUDING SAME, AND IMAGE FORMING APPARATUS INCLUDING THE IMAGE READING DEVICE WITH INDEPENDENT COVER AND RESTRICTION MEMBER

(75) Inventors: Yohei Osanai, Yokohama (JP); Kohji Hatayama, Ebina (JP); Takayuki Andoh, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 12/659,366

(22) Filed: Mar. 5, 2010

(65) Prior Publication Data

US 2010/0225977 A1    Sep. 9, 2010

(30) Foreign Application Priority Data

Mar. 5, 2009   (JP) .................................. 2009-051867

(51) Int. Cl.
 *B65H 3/54*   (2006.01)
(52) U.S. Cl. ...................... 271/124; 271/117; 271/121
(58) Field of Classification Search .................. 271/117, 271/118, 121, 124
 See application file for complete search history.

(56) References Cited

U.S. PATENT DOCUMENTS

| | | | |
|---|---|---|---|
| 2004/0071486 A1* | 4/2004 | Manabe et al. | 399/367 |
| 2005/0263955 A1* | 12/2005 | Kim | 271/121 |
| 2008/0136084 A1* | 6/2008 | Hsu et al. | 271/109 |

FOREIGN PATENT DOCUMENTS

| | | |
|---|---|---|
| JP | 3335973 | 8/2002 |
| JP | 3621301 | 11/2004 |
| JP | 4072409 | 1/2008 |

OTHER PUBLICATIONS

Abstract of JP 2001-163469 Published on Jun. 19, 2001.
Abstract of JP 2004-115164 Published on Apr. 15, 2004.
Abstract of JP 2001-048369 Published on Feb. 20, 2001.

* cited by examiner

*Primary Examiner* — Gerald McClain
(74) *Attorney, Agent, or Firm* — Harness, Dickey & Pierce, P.L.C.

(57) ABSTRACT

A sheet feeding unit has a main body, a sheet stack portion attached to the main body to accommodate a stack of sheets, a sheet feeding device disposed substantially above the sheet stack portion to feed the sheet onward, which is movable between a sheet feeding position at which the sheet feeding device contacts the sheet and feeds the sheet onward and a separating position at which the sheet feeding device separates from the sheet and does not feed the sheet onward, a separation unit to separate the sheets, a restriction member disposed between the sheet feeding device and the separation unit and is switchable between a sheet feeding state when the sheet feeding device is at the sheet feeding position and a sheet restriction state when the sheet feeding device is at the separation position, and a cover openably closable relative to the main body and constituted as an independent member.

9 Claims, 5 Drawing Sheets

SHEET FEEDING UNIT, IMAGE READING DEVICE INCLUDING SAME, AND IMAGE FORMING APPARATUS INCLUDING THE IMAGE READING DEVICE WITH INDEPENDENT COVER AND RESTRICTION MEMBER

CROSS-REFERENCE TO RELATED APPLICATIONS

This patent application is based on and claims priority pursuant to 35 U.S.C. §119 from Japanese Patent Application No. 2009-051867, filed on Mar. 5, 2009 in the Japan Patent Office, which is hereby incorporated herein by reference in its entirety.

BACKGROUND OF THE INVENTION

1. Field of the Invention

The present invention generally relates to a sheet feeding device, and more particularly, to an image reading device such as a scanner including a sheet feeding device and an image forming apparatus such as a copier or a facsimile incorporating the image reading device.

2. Description of the Background Art

Typically, an automatic document feeder (ADF) has a sheet feeding mechanism that is equipped with a sheet restriction member, also known as a shutter member, to stop a sheet stack consisting of multiple sheets at a predetermined position in order to prevent a user from placing an excess number of sheets at the far end in a sheet separating portion of the ADF where a single sheet is separated and fed to an image reading device one sheet at a time.

In one related-art sheet feeding mechanism, a sheet feed member is provided substantially at the upper portion of a document table on which a document to be read is placed. When reading a multi-sheet document placed on the document table, the sheet feed member, which is contactable to and separable from the sheets, feeds the sheets of the document to a separation portion of the ADF where the sheets are separated and fed to a downstream image reading device one sheet at a time.

The sheet feed mechanism also has a link member that causes the sheet restriction member, which is provided between the separation portion and the sheet feed member, to restrict advancement of the sheet. When the sheet is fed onward, the link member retracts the restriction member to a position at which the restriction member allows the sheet to move onward in conjunction with the sheet feed member contacting the sheet.

By contrast, as the sheet feed member separates from the sheet after feeding the sheet onward, the link member moves the sheet restriction member to a sheet restriction position to prevent the next sheet placed on the document table from advancing to the separation portion before the sheet feed member is ready to send the sheet.

Although generally adequate for its intended purpose, the above-described configuration has a drawback in that, because the restriction member is provided to an openably closable cover, the stacked sheets on the document table get disorganized when the cover is opened. Furthermore, this configuration does not have a release mechanism that releases stress applied to the sheet restriction member when a large number of sheets is fed and pushes the sheet restriction member, overstressing the sheet restriction member and thereby possibly damaging the sheet restriction member.

In another related-art sheet feeding mechanism, the sheet restriction member that aligns the leading edges of the sheets is rotatable about a shaft separate from a rotary shaft of a pick-up roller that contacts and picks up the sheet. The sheet restriction member includes a groove which the raised rotary shaft of the pick-up roller engages. When the pick-up roller is raised, the rotary shaft thereof engages the groove of the sheet restriction member, thereby regulating movement of the sheet restriction member. When the pick-up roller is lowered, the rotary shaft is released from the groove and can move freely.

Although advantageous, there is a drawback to such a configuration in that this configuration also does not include a system that releases stress applied to the sheet restriction member. Consequently, the restriction member may be damaged.

Furthermore, this configuration does not include an amplification mechanism for amplifying movement of the pick-up roller. Insufficient movement of the pick-up roller can cause the rotary shaft to remain in the groove.

Still further, the rotary shaft of the sheet restriction member needs to be disposed substantially above the pick-up roller so that the rotary shaft can engage the groove, thereby complicating efforts to make the device compact. If the rotary shaft of the sheet restriction member is not located substantially above the pick-up roller, desirable moment of rotation of the restriction member is difficult to achieve.

Still another related-art sheet feeding mechanism also includes a rotatable shutter member serving as the sheet-regulating restriction member that moves reciprocally up and down downstream from the sheet tray in a direction of conveyance of the sheet in conjunction with rotation of a rotary arm member provided above the sheet tray, the shutter member being rotatable about a rotary axis provided on a tip of the rotary arm member.

This configuration has a similar problem as in the foregoing related-art configurations in that this configuration also does not have a release mechanism that releases stress when the shutter member is overstressed. Consequently, the restriction member may be damaged. Furthermore, the need for space for the shutter member to move up and down complicates efforts to make the image forming apparatus compact.

SUMMARY OF THE INVENTION

In view of the foregoing, in one illustrative embodiment of the present invention, a sheet feeding unit includes a main body, a sheet stack portion, a sheet feeding device, a sheet feeding device holder, a separation unit, a restriction member, a restriction adjuster, a restriction member holder, and a cover. The sheet stack portion is attached to the main body to accommodate a stack of sheets. The sheet feeding device is disposed substantially above the sheet stack portion and contactable against a top sheet of the sheet stack, to feed the sheet onward. The sheet feeding device holder rotatably holds the sheet feeding device and moves the sheet feeding device between a sheet feeding position at which the sheet feeding device contacts the sheet and feeds the sheet onward and a separating position at which the sheet feeding device separates from the sheet and does not feed the sheet onward. The separation unit separates and feeds onward the sheets fed onward by the sheet feeding device one by one. The restriction member is disposed between the sheet feeding device and the separation unit and switchable between a sheet restriction state in which the restriction member prevents the sheet from reaching the separation unit and a sheet feeding state in which the restriction member allows the sheet to reach the separation unit. The restriction adjuster switches the state of the restriction member to the sheet feeding state when the sheet feeding device is at the sheet feeding position and to the sheet restriction state when the sheet feeding device is at the separation position. The restriction member holder is supported by the main body to hold the restriction member. The cover is held by the main body and openably closable relative to the main body. The cover is constituted as an independent member independent from the sheet feeding device holder, the separation unit, the restriction adjuster, and the restriction member holder.

In another illustrative embodiment of the present invention, a sheet feeding unit includes a main body, a sheet stack portion, a sheet feeding device, a sheet feeding device holder, a separation unit, a restriction member, a restriction adjuster, a restriction member holder, and a cover. The sheet stack portion is attached to the main body to accommodate a stack of sheets. The sheet feeding device is disposed substantially above the sheet stack portion and contactable against a top sheet of the sheet stack, to feed the sheet onward. The sheet feeding device holder rotatably holds the sheet feeding device and moves the sheet feeding device between a sheet feeding position at which the sheet feeding device contacts the sheet and feeds the sheet onward and a separating position at which the sheet feeding device separates from the sheet and does not feed the sheet onward. The separation unit separates and feeds onward the sheets fed onward by the sheet feeding device one by one. The restriction member is disposed between the sheet feeding device and the separation unit and switchable between a sheet restriction state in which the restriction member prevents the sheet from reaching the separation unit and a sheet feeding state in which the restriction member allows the sheet to reach the separation unit. The restriction adjuster switches the state of the restriction member to the sheet feeding state when the sheet feeding device is at the sheet feeding position and to the sheet restriction state when the sheet feeding device is at the separation position. The restriction member holder is supported by the main body to hold the restriction member. The cover is openably closable relative to the main body and kept closed relative to the main body at a predetermined retaining force. When the cover is closed and the restriction adjuster is at the sheet restriction state, in a case in which the sheet stack presses the restriction member with a predetermined pressure, the cover is opened, thereby switching the restriction member to the sheet feeding state.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 1:
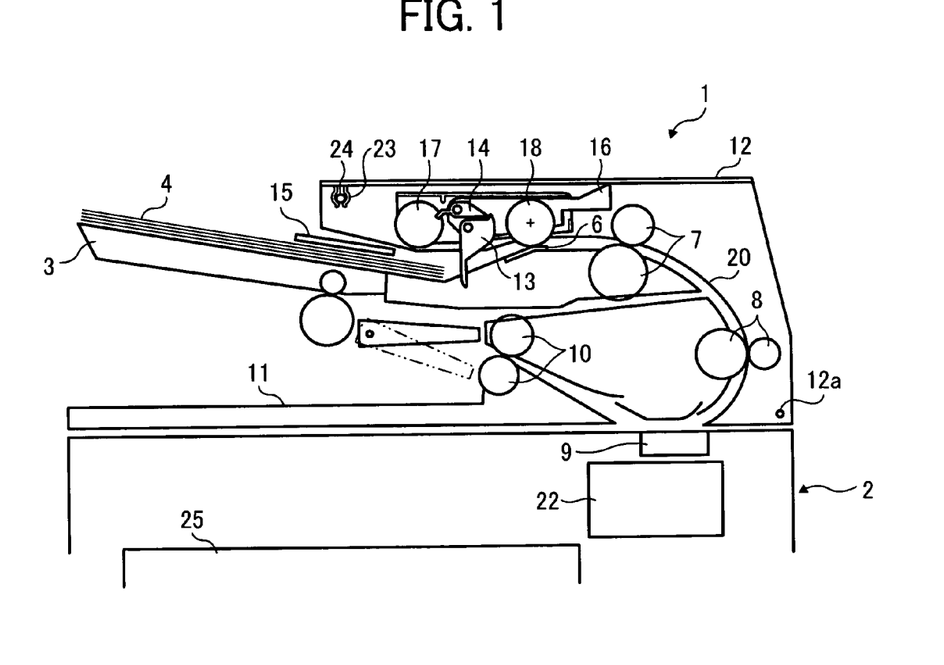
FIG. 1 is a cross-sectional schematic view of an image forming apparatus including an automatic document feeder (ADF) according to an illustrative embodiment of the present invention.

Referring now to the drawings, wherein like reference numerals designate identical or corresponding parts throughout the several views, and initially to FIG. 1, one example of an image forming apparatus according to an illustrative embodiment of the present invention is described.

Referring now to FIG. 1, there is provided a cross-sectional schematic view of an image forming apparatus 2 including a document reading device 22 equipped with an automatic document feeder 1 according to the illustrative embodiment.

In FIG. 1, the image forming apparatus 2 includes the automatic document feeder (hereinafter referred to as an ADF) 1, the image reading unit 22, an image forming unit 25, and so forth. The ADF 1 is openably disposed on top of the image forming apparatus 2. An image on the sheet sent by the ADF 1 is read by the image reading unit 22. Subsequently, the image on the sheet being read is formed on a recording medium by the image forming unit 25.

It is to be noted that the image forming apparatus herein refers to, but is not limited to, a copier and a facsimile machine. The present invention is not limited to the image forming apparatus described above. The present invention can be employed in an image forming apparatus including a post processing device equipped with a document feeder. Furthermore, the present invention can be employed in an image reading device such as a scanner including a sheet feeder.

Figure 2A:
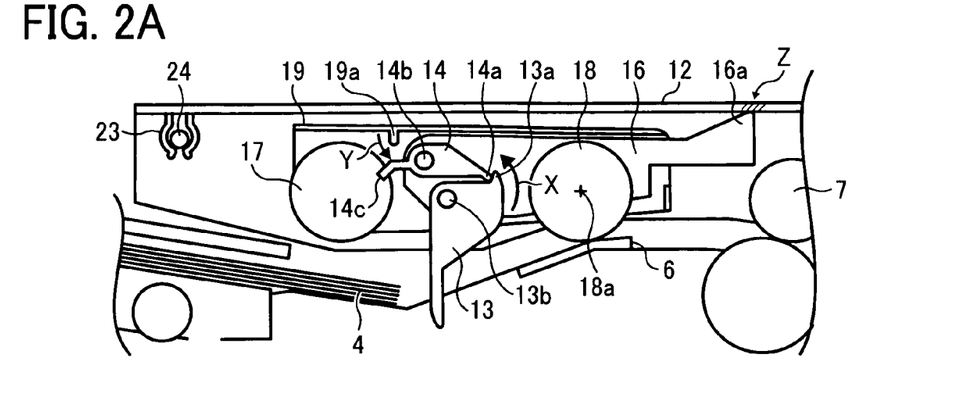
FIG. 2A is an enlarged cross-sectional schematic view of the automatic document feeder of FIG. 1 when a sheet feeding device of the automatic document feeder is at a position where the sheet feeding device does not feed a document according to an illustrative embodiment of the present invention.
Figure 2B:
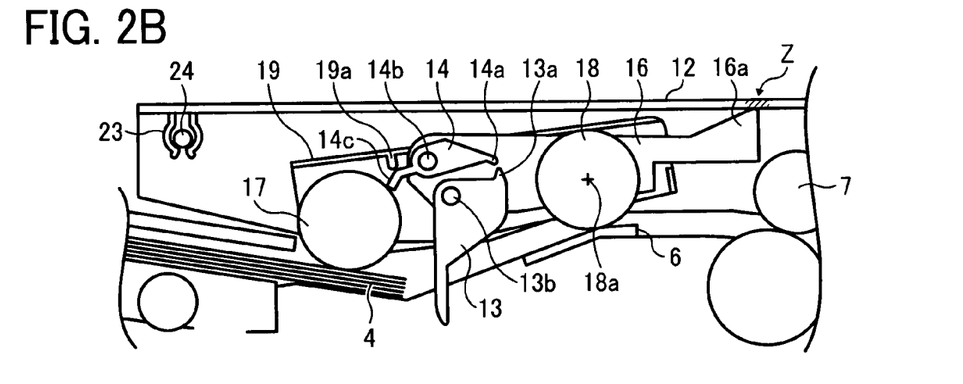
FIG. 2B is an enlarged cross-sectional schematic view of the automatic document feeder when the sheet feeding device is at a position where the sheet feeding device feeds the sheet according to an illustrative embodiment of the present invention.
Figure 2C:
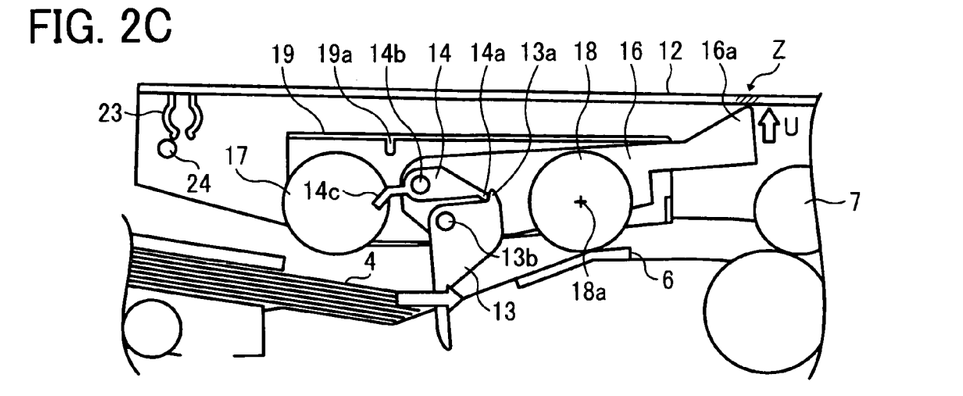
FIG. 2C is an enlarged cross-sectional schematic view of the automatic document feeder when a predetermined force is applied to a sheet restriction member of the automatic document feeder and a top cover of the automatic document feeder is opened according to an illustrative embodiment of the present invention.
Figure 3:
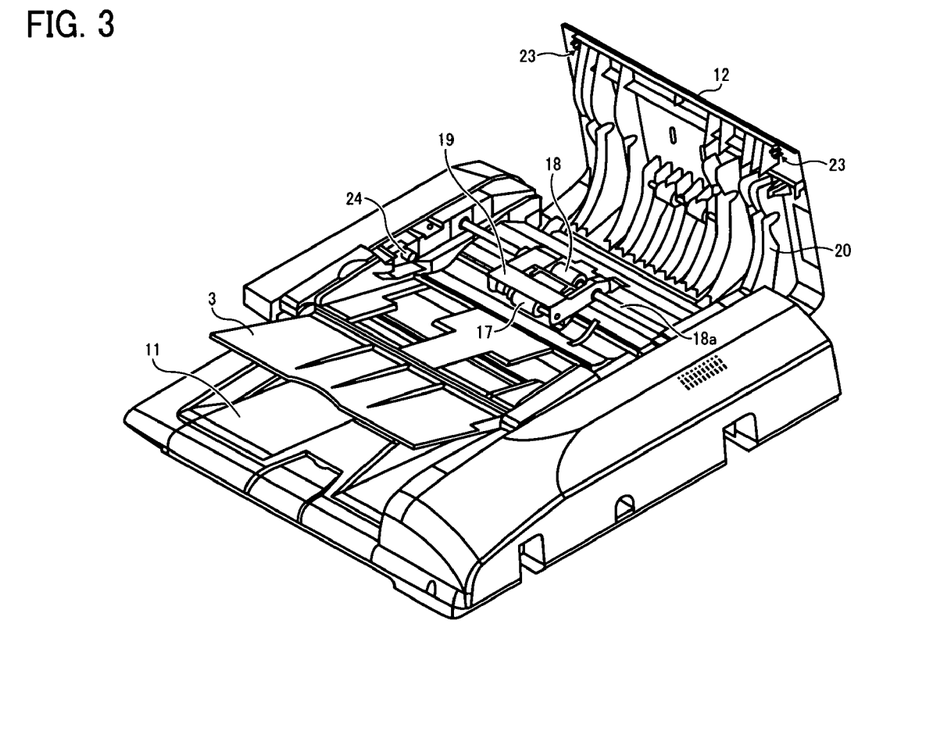
FIG. 3 is a perspective view of the automatic document feeder when the top cover is opened according to an illustrative embodiment of the present invention.
Figure 4A:
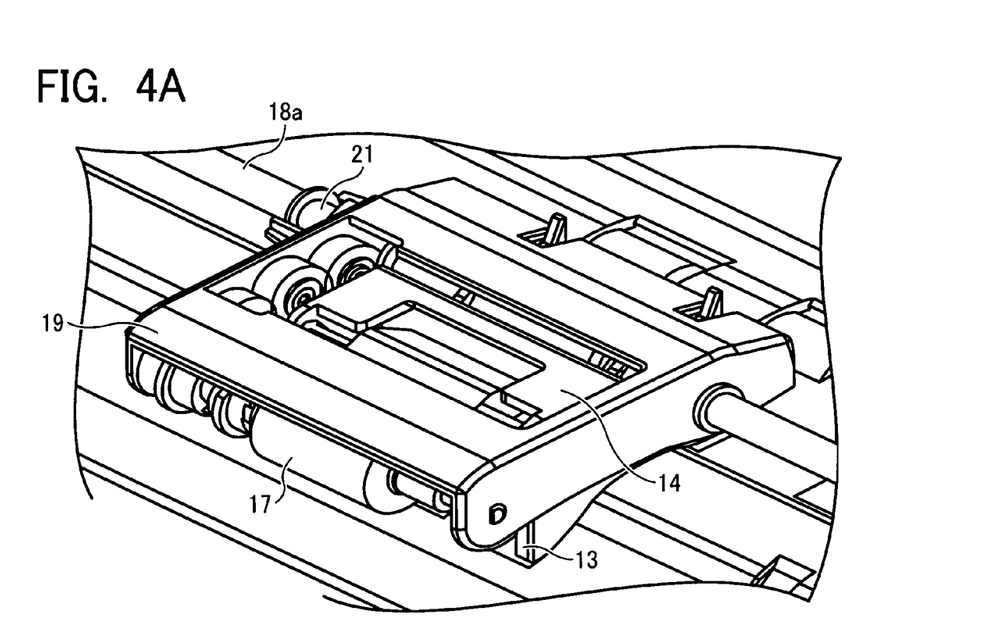
FIG. 4A is an enlarged schematic view of a separation portion of the automatic document feeder according to an illustrative embodiment of the present invention.
Figure 4B:
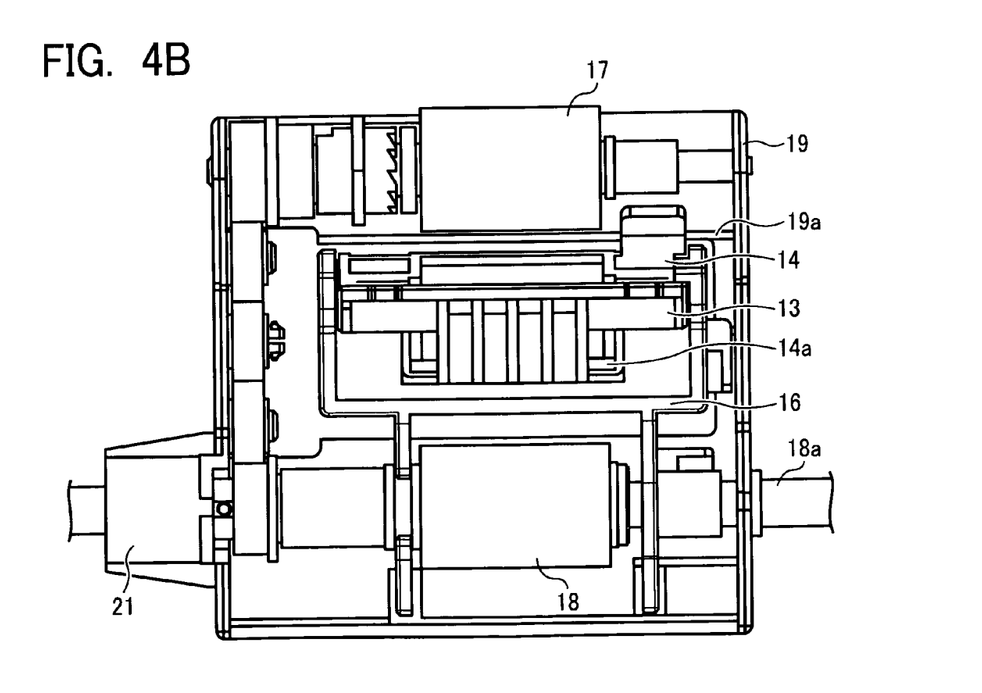
FIG. 4B is a front view of the separation portion of the automatic document feeder as viewed from a sheet conveyance side according to an illustrative embodiment of the present invention.
Figure 5:
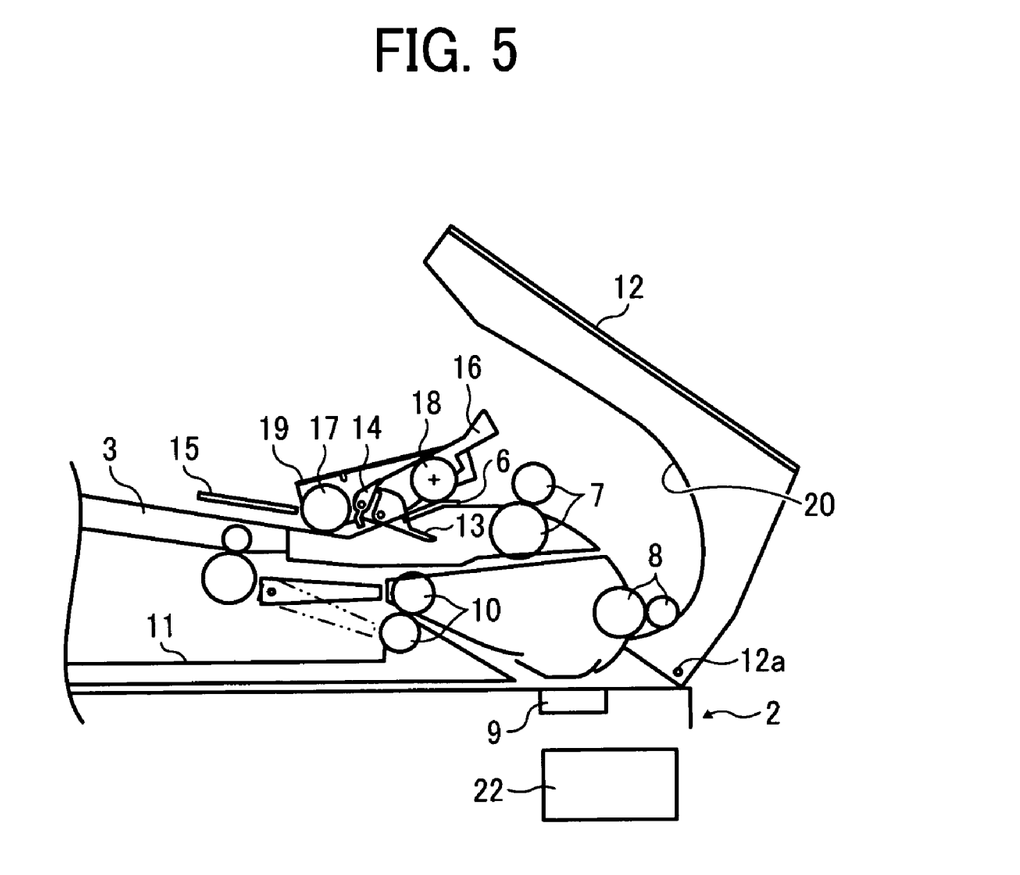
FIG. 5 is a cross-sectional schematic view of the automatic document feeder of FIG. 3.

With reference to FIGS. 1 through 5, a detailed description is provided of the ADF 1 according to the illustrative embodiment. FIG. 2A is an enlarged cross-sectional schematic view of the ADF 1 of FIG. 1 when a pick-up roller 17 serving as a sheet feeding device of the ADF 1 is at a position where the pick-up roller 17 does not feed a document. FIG. 2B is an enlarged cross-sectional schematic view of the ADF 1 when the pick-up roller 17 is at a position where the sheet feeding device feeds the sheet. FIG. 2C is an enlarged cross-sectional schematic view of the ADF 1 when a predetermined force is applied to a shutter member 13 serving as a sheet restriction member of the ADF 1 and a top cover 12 of the ADF 1 is opened. FIG. 3 is a perspective view of the ADF 1 when the top cover is opened. FIG. 4A is an enlarged schematic view of a sheet separation portion of the ADF 1. FIG. 4B is a front view of the separation portion as viewed from a sheet conveyance side. FIG. 5 is a cross-sectional schematic view of the ADF 1 of FIG. 3.

As illustrated in FIG. 1, the ADF 1 includes a document table 3 serving as a sheet stack portion, the pick-up roller 17 serving as the sheet feeding device, a document holder 15, the top cover 12, a rotary shaft 12a, a feed roller 18 serving as a separation member, pairs of rollers 7 and 8, a blocking member 6, a pair of sheet discharge rollers 10, a sheet discharge portion 11 and so forth. A reference numeral 4 refers to a document. It is to be noted that unless otherwise specified, a document refers to both a single sheet and a plurality of sheets.

In the ADF 1, the document 4, is loaded at a predetermined position of the document table 3 such that the leading edge thereof contacts the shutter member 13 serving as the sheet restriction member. The sheet holder 15 regulates the document 4 to prevent curling of the document 4. A possibility of jamming and image degradation can be minimized if the sheet holder 15 regulates the document 4 until the document 4 reaches the proximity of the pick-up roller 17. Thus, the top cover 12 and the sheet holder 15 may overlap.

The top cover 12 is rotatably attached to the ADF 1. The top cover 12 is rotatable about the rotary shaft 12a provided to the main body of the ADF 1. When the top cover 12 is closed, an engaging member 23 projectingly provided to the top cover 12 engages a retainer 24 provided to the main body of the ADF 1. The retainer 24 holds the engaging member 23 at a certain strength, thereby preventing the top cover 12 from rotating in a clockwise direction. Accordingly, the top cover 12 is kept closed. When the top cover 12 is opened, a sheet conveyance path in the ADF 1 is exposed.

According to the illustrative embodiment of the present invention, as long as the top cover 12 is held at the certain strength and kept closed, the engaging member 23 can be provided to the main body of the ADF 1 and the retainer 24 can be provided to the top cover 12. However, the holding mechanism of the top cover 12 is not limited to the engaging member 23 and the retainer 24 described above. Alternatively, any other suitable holding mechanism can be employed.

The pick-up roller 17 feeds the document 4 to a sheet separation unit consisting of the blocking member 6 and the feed roller 18. The feed roller 18 of the sheet separation unit picks up and sends a top sheet of the document 4 while the blocking member 6 prevents other sheets from advancing, thereby separating and feeding the document one sheet at a time.

Subsequently, a sheet of the document 4 separated from the rest of the sheet stack is fed to the downstream of the sheet feeding direction by the pairs of rollers 7 and 8. An image on the surface of the document 4 is read by a contact glass 9. When a back of the document 4 is not read, the document 4 passes through the pair of the sheet discharge rollers 10 and is discharged onto the sheet discharge portion 11.

When reading the back of the sheet, the sheet is sent to a switchback unit, not illustrated by the sheet discharge rollers 10 and switched back. The sheet is then sent further downstream in the sheet feeding direction by the pair of the rollers 7 and 8. The back of the sheet is read by the contact glass 9.

When such an ADF is used, if jamming occurs and/or a sheet of a relatively small size, for example, A5 and A6, is recovered, it is necessary to rotatably move the top cover 12 and/or the document table 3.

According to the illustrative embodiment, as illustrated in FIG. 1, the shutter member 13 serving as the restriction member, a link member 14 serving as a restriction adjuster, a sheet feeding device holder 19 for rotatably holding the pick-up roller 17, a restriction member holder 16 for holding the shutter member 13 and the link member 14, the pick-up roller 17 serving as the sheet feed member, the blocking member 6, the feed roller 18 are disposed in the ADF 1 substantially below the top cover 12. The blocking member 6 and the feed roller 18 constitute the sheet separation unit. The sheet feeding device holder 19 and the link member 14 are rotatably coaxially mounted on the main body of the ADF 1.

The top cover 12 is openably and closably held on the ADF 1. The top cover 12 is constituted as an independent member independent from the shutter member 13, the link member 14, the restriction member holder 16, the pick up roller 17, the feed roller 18, and the sheet feeding device holder 19.

The shutter member 13 includes a contact portion 13a that contacts a portion of the link member 14. The shutter member 13 serving as the sheet restriction member is disposed between the pick-up roller 17 and the feed roller 18. The shutter member 13 is switched between a sheet restriction state in which the shutter member 13 prevents the document 4 on the document table 3 from advancing to the feed roller 18 and a sheet feed state in which the shutter member 13 allows the document 4 to advance to the feed roller 18.

The link member 14 serving as the restriction adjuster includes a contact portion 14a, a rotary shaft 14b, and a pressure receiving portion 14c. The contact portion 14a contacts the contact portion 13a of the shutter member 13. The rotary shaft 14b is held rotatably by the restriction member holder 16. The pressure receiving portion 14c is disposed opposite the contact portion 14a via the rotary shaft 14b. The pressure receiving portion 14c includes a base portion in proximity to the rotary shaft 14b and a tip portion at a distal end from the rotary shaft 14b.

As will be later described, the tip portion of the pressure receiving portion 14c is disposed at a pressing direction of a projection 19a relative to the radial direction of the rotary shaft 14b from the base portion, such that when the projection 19a presses the pressure receiving portion 14c and the pressure receiving portion 14c rotates, the pressed portion pressed by the projection 19a shifts from the base portion to the tip portion.

Normally, the link member 14 is positioned at a place illustrated in FIG. 2A and rotation thereof in the clockwise direction is restricted by a rotation blocker, not illustrated. When the sheet feeding device holder 19 is at the sheet feeding position as illustrated in FIG. 2B, the contact portion 14a and the pressure receiving portion 14c of the link member 14 are rotated about the rotary shaft 14b in the counterclockwise direction and positioned as illustrated in FIG. 2B. Accordingly, the shutter member 13 is switched to the sheet feeding state.

By contrast, when the sheet feeding device holder 19 is moved from the sheet feeding state to the sheet restriction state, the contact portion 14a and the pressure receiving portion 14c of the link member 14 rotate about the rotary shaft 14b due to self weight in the clockwise direction and return to the position illustrated in FIG. 2A. Accordingly, the shutter member 13 returns to the sheet restriction state.

As illustrated in FIGS. 2A through 2C, the restriction member holder 16 and the sheet feeding device holder 19 are held rotatably about a feed roller shaft 18a that rotates the feed roller 18. The center of gravity of the restriction member holder 16 is located at the pick-up roller 17 side that coincides with the upstream side in the sheet feeding direction. Therefore, by having a holder retaining portion 16a of the restriction member holder 16 to contact a contact portion Z of the top cover 12, the restriction member holder 16 is positioned properly when the top cover 12 is closed.

In other words, when the holder retaining portion 16a contacts the contact portion Z of the top cover 12, the restriction member holder 16 is positioned properly. The holder retaining portion 16a and the contact portion Z constitute a positioning mechanism.

In the meantime, as illustrated in FIGS. 4A and 4B, the position of the sheet feeding device holder 19 is secured by a torque limiter 21 provided to the feed roller shaft 18a. The feed roller shaft 18a is provided to the ADF 1, not the top cover 12.

Referring now to FIGS. 2A through 2C, a description is provided of a sheet feeding operation of the ADF 1 according to the illustrative embodiment.

As illustrated in FIG. 2A, the document 4 consisting of a single sheet or multiple sheets is placed on the document table 3 and the leading edge(s) of the document 4 contacts the shutter member 13. If the pressure of the document 4 pressing the shutter member 13 is within a predetermined pressure, the shutter member 13 is prevented from rotating in the counterclockwise direction at a predetermined position, thereby preventing the document 4 from being pushed to the downstream side in the sheet feeding direction. In other words, rotation of the shutter member 13 in the counterclockwise direction is restricted.

While the shutter member 13 tries to rotate about the rotary shaft 13b held by the restriction member holder 16 in the counterclockwise direction indicated by arrow X in FIG. 2A, rotation of the contact portion 14a in the clockwise direction is restricted and the contact portion 13a abuts the contact portion 14a, thereby restricting rotation of the shutter member 13 in the counterclockwise direction indicated by arrow X.

As a result, rotation power in the counterclockwise direction about the rotary shaft 13b of the shutter member 13 causes the feed roller shaft 18a serving as the rotary shaft of the restriction member holder 16 to rotate in the counterclockwise direction.

However, if the power of rotation about the rotary shaft 13b of the shutter member 13 in the counterclockwise direction is less than the predetermined value, the power of rotation about the feed roller shaft 18a in the counterclockwise direction is less than the retaining force of the retainer 24 retaining the engaging member 23 and thereby keeping the top cover 12 closed. Consequently, the restriction member holder 16 is prevented from rotating in the counterclockwise direction about the feed roller shaft 18a, and the shutter member 13 is prevented from rotating about the rotary shaft 13b in the counterclockwise direction, thereby preventing the document 4 from being pushed to the downstream side in the sheet feeding direction from the predetermined position.

When a torque of at least a certain value is transmitted to the feed roller shaft 18a, the sheet feeding device holder 19 is rotated about the feed roller shaft 18a in the counterclockwise direction at a certain torque that is regulated by the torque limiter 21. Subsequently, as illustrated in FIG. 2B, the pick-up roller 17 is lowered and pushed against the document 4, thereby being able to feed the top sheet of the document 4.

When the projection 19a of the sheet feeding device holder 19, serving as a pressing member, presses substantially near the base of the pressure receiving portion 14c of the link member 14, the link member 14 rotates about the rotary shaft 14b in the counterclockwise direction relative to the restriction member holder 16 so that the contact portion 14a of the link member 14 is disengaged from the contact portion 13a of the shutter member 13. Accordingly, the shutter member 13 is in the sheet feeding state in which the shutter member 13 can rotate freely, allowing the top sheet of the document 4 to be fed.

The place of the pressure receiving portion 14c that the projection 19a first presses is substantially near the base of the pressure receiving portion 14c, that is, substantially near the rotary shaft 14b of the link member 14. Therefore, even if the amount of movement of the projection 19a indicated by arrow Y is substantially small, the amount of movement of the edge portion of the contact portion 14a that is distance away from the rotary shaft 14b, in the counterclockwise direction indicated by arrow X, can be large. This allows the contact portion 14a to separate from the contact portion 13a. With this configuration, it is not necessary to rotate the sheet feeding device holder 19 by a large amount, thereby reducing the size of the sheet separating portion.

According to the illustrative embodiment, the tip portion of the pressure receiving portion 14c is bent downward. That is, the tip portion of the pressure receiving portion 14c is bent from the radial direction of the rotary shaft 14c to the counterclockwise direction. Therefore, even if the sheet feeding device holder 19 rotates by a large amount causing the projection 19a to move downward by a large amount, the tip portion of the pressure receiving portion 14c is lowered as described above, and the amount of movement of the link member 14 indicated by arrow X relative to the projection 19a decreases along the way.

This is because the contact position of the projection 19a and the pressure receiving portion 14c shifts from the bent portion of the pressure receiving portion 14c to the tip portion thereof as the projection 19a moves down, the projection 19a slides down along the slant surface of the bent portion of the pressure receiving portion 14c.

With this configuration, even if the projection 19a moves down, the link member 14 does not rotate by a large angle. Rather, the angle of rotation of the link member 14 decreases, thereby preventing the contact portion 14a of the link member 14 from rising and hitting the top cover 12 as the link member 14 rotates.

Referring back to FIG. 2A, a description is provided of the sheet feeding mechanism when the pressure of the document 4 pressing against the shutter member 13 is equal to or greater than the predetermined amount.

When the pressure of the document 4 against the shutter member 13 is equal to or greater than the predetermined amount, the contact member 14a of the link member 14 does not separate from the contact member 13 of the shutter member 13. Consequently, the pressure of the document 4 against the shutter member 13 causes rotation power of the restriction member holder 16 about the feed roller shaft 18a in the counterclockwise direction so that the shutter holder retaining portion 16a pushes up the contact portion Z of the top cover 12 in the direction of arrow U in FIG. 2C.

The power of rotation of the restriction member holder 16 pushing up the top cover 12 is greater than the retaining force of the retainer 24 that engages the engaging portion 23 and prevents the top cover 12 from rotating about the roller shaft 12a in the clockwise direction keeping the top cover 12 closed. As a result, as illustrated in FIG. 2C, the top cover 12 starts to rotate about the rotary shaft 12a in the clockwise direction, thereby disengaging the retainer 24 from the engaging portion 23 and releasing the top cover 12. The top cover 12 is opened.

With this configuration, when the force applied to the shutter member 13 is relatively large, the top cover 12 is opened before the shutter member 13 gets damaged. The excess force of the document 4 is released.

Furthermore, since the pressure receiving portion 14c is formed such that the tip portion thereof is bent downward, even if the amount of movement of the pick-up roller 17 is relatively small, the shutter member 13 can still be switched to the sheet feeding state, thereby allowing the sheet to be fed and reducing the size of the separating portion.

Still further, even if the height of the top cover 12 is not high and the bottom surface thereof includes sheet guide members 20 as illustrated in FIG. 3, the link member 14 does not undesirably hit the sheet guide members 20, thereby preventing damage.

As illustrated in FIG. 5, when the document 4 is not loaded in the sheet separating portion and the top cover 12 is opened, regardless of the position of the restriction member holder 16, the shutter member 13 can be reliably switched to the sheet restriction state if the top cover 12 is closed and the pick-up roller 17 is raised. (It is possible to change the state of the shutter member 13 from the state shown in FIG. 5 to the state shown in FIG. 2A, if the operation described above is performed in reverse order.)

According to the illustrative embodiment, the top cover 12 can be opened or closed regardless of the state of the shutter member 13. That is, the top cover 12 can be opened or closed when the shutter member 13 is either in the sheet restriction state or the sheet feeding state. Thus, the document 4 consisting of multiple sheets does not get disorganized.

Furthermore, according to the illustrative embodiment, the shutter member 13 does not retract up or down, thereby reducing the size of the ADF 1 as a whole. Thus, a compact ADF can be achieved.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A sheet feeding unit, comprising:
a main body;
a sheet stack portion attached to the main body to accommodate a stack of sheets;
a sheet feeding device disposed substantially above the sheet stack portion, contactable against a top sheet of the sheet stack, to feed the sheet onward;
a sheet feeding device holder to rotatably hold the sheet feeding device and move the sheet feeding device between a sheet feeding position at which the sheet feeding device contacts the sheet and feeds the sheet onward and a separating position at which the sheet feeding device separates from the sheet and does not feed the sheet onward;
a separation unit to separate and feed onward the sheets fed onward by the sheet feeding device one by one;
a restriction member disposed between the sheet feeding device and the separation unit and switchable between a sheet restriction state in which the restriction member prevents the sheet from reaching the separation unit and a sheet feeding state in which the restriction member allows the sheet to reach the separation unit;
a restriction adjuster to switch the state of the restriction member to the sheet feeding state when the sheet feeding device is at the sheet feeding position and to the sheet restriction state when the sheet feeding device is at the separation position;

a restriction member holder supported by the main body, to hold the restriction member; and a cover held by the main body and openably closable relative to the main body, the cover constituted as an independent member independent from the sheet feeding device holder, the separation unit, the restriction adjuster, and the restriction member holder, wherein the separation unit includes a feed roller to pick up and send a top sheet therethrough and a blocking member to prevent other sheets from advancing, wherein the restriction member holder and the sheet feeding device holder are held rotatably about a feed roller shaft that rotates the feed roller, and wherein the sheet feeding device holder and the restriction member holder are separate members and relatively moveable with respect to each other.

2. The sheet feeding unit according to claim 1, wherein the restriction member holder includes the restriction member and the restriction adjuster.

3. The sheet feeding unit according to claim 1, wherein the sheet feeding device holder includes a pressing member and the restriction adjuster having a pressure receiving portion, the pressing member presses the pressure receiving portion of the restriction adjuster to move the sheet feeding device from the separation position to the sheet feeding position, and movement of the restriction adjuster decreases as the pressing member continues pressing the pressure receiving portion of the restriction adjuster.

4. The sheet feeding unit according to claim 3, further comprising a rotary shaft, wherein the pressure receiving portion of the restriction adjuster is rotatable about the rotary shaft and includes a base portion in proximity to the rotary shaft and a tip portion at a distal end from the rotary shaft, and the tip portion of the pressure receiving portion is disposed at a pressing direction of the pressing member relative to the radial direction of the rotary shaft from the base portion, such that when the pressing member presses the pressure receiving portion and the pressure receiving portion rotates, the pressed portion pressed by the pressure member shifts from the base portion to the tip portion.

5. The sheet feeding unit according to claim 1, wherein when the cover is closed, the restriction member holder contacts the cover and is positioned in place.

6. An image reading unit, comprising:
the sheet feeding unit of claim 1; and
an image reading device to read an image on a sheet fed by the sheet feeding unit.

7. An image forming apparatus, comprising:
the image reading unit of claim 6; and
an image forming device to form an image read by the image reading unit on a recording medium.

8. The sheet feeding unit according to claim 1, wherein the blocking member of the separation unit is a planar member that conforms to the main body.

9. The sheet feeding unit according to claim 1, wherein a center of gravity of the restriction member holder is located at the sheet feeding device side that coincide with an upstream side in a sheet feeding direction.

* * * * *